United States Patent
Schmidt

(10) Patent No.: US 7,136,446 B2
(45) Date of Patent: Nov. 14, 2006

(54) METHOD AND APPARATUS FOR DATA AND CLOCK RECOVERY IN A BIPHASE-CODED DATA SIGNAL

(75) Inventor: Peter Schmidt, Munich (DE)

(73) Assignee: Rohde & Schwarz GmbH & Co.KG, Munich (DE)

( * ) Notice: Subject to any disclaimer, the term of this patent is extended or adjusted under 35 U.S.C. 154(b) by 846 days.

(21) Appl. No.: 10/203,354

(22) PCT Filed: Jan. 16, 2001

(86) PCT No.: PCT/EP01/00437

§ 371 (c)(1),
(2), (4) Date: Aug. 9, 2002

(87) PCT Pub. No.: WO01/63865

PCT Pub. Date: Aug. 30, 2001

(65) Prior Publication Data

US 2003/0012323 A1 Jan. 16, 2003

(30) Foreign Application Priority Data

Feb. 21, 2000 (DE) .............................. 100 07 783

(51) Int. Cl.
*H03D 3/24* (2006.01)
(52) U.S. Cl. ..................................................... 375/376
(58) Field of Classification Search ............... 375/376, 375/360, 361
See application file for complete search history.

(56) References Cited

U.S. PATENT DOCUMENTS

| | | | | |
|---|---|---|---|---|
| 4,251,831 A | * | 2/1981 | Kamath | 348/617 |
| 4,912,730 A | * | 3/1990 | Erhart | 375/361 |
| 4,992,790 A | | 2/1991 | Montgomery | |
| 5,073,904 A | * | 12/1991 | Nakamura et al. | 375/340 |
| 5,574,756 A | | 11/1996 | Jeong | |
| 5,953,386 A | | 9/1999 | Anderson | |
| 6,008,746 A | | 12/1999 | White | |

FOREIGN PATENT DOCUMENTS

| | | |
|---|---|---|
| DE | 44 08 963 A1 | 9/1995 |
| DE | 44 44 601 C1 | 7/1996 |
| DE | 690 31 205 T2 | 1/1998 |
| EP | 0 425 302 B1 | 5/1991 |
| EP | 0 930 713 A1 | 7/1999 |

OTHER PUBLICATIONS

Pieter W. Hooijmans et al., Penalty Free Biphase Linecoding for Pattern Independent FSK Coherent Transmission Systems, Journal of Lightwave Technology, Mar. 8, 1990; pp. 323-328; vol. 8 No. 3; New York, US.

* cited by examiner

*Primary Examiner*—Chieh M. Fan
*Assistant Examiner*—Jia Lu

(57) ABSTRACT

A method and apparatus for data and clock recovery in a biphase-coded data signal is described, in which the data signal is sampled using a sampling frequency that is greater than twice the bit frequency of the data signal. The bit limits of the data signal are then determined from the sampling values and used to recover the both the data bits and the corresponding bit clock pulse of the data signal.

7 Claims, 2 Drawing Sheets

METHOD AND APPARATUS FOR DATA AND CLOCK RECOVERY IN A BIPHASE-CODED DATA SIGNAL

FIELD OF THE INVENTION

The invention relates to a method and an apparatus for data and clock recovery in a biphase-coded data signal.

BACKGROUND OF THE INVENTION

There are two types of biphase codes, the so-called biphase mark code and the so-called biphase space code. In the biphase mark code, logical ones are specially coded, and, in the biphase space code, logical zeros are specially coded. In the biphase mark code, there is always a change of the logical states between the data bits of the data signal, and in the case of a logical one there is also a change in the data-bit middle, whereas there is not in the case of a logical zero. Lines A and B according to FIG. 2 show this relationship. Similar considerations apply to the biphase space code.

For data recovery of such a biphase-coded data signal, the bit clock needs to be recovered on the reception side. To that end, it is known to use a phase-synchronized clock generator (PLL), which is exactly locked to double the bit frequency of the data signal. At substantially high data rates, however, it is difficult to maintain the requisite accurate phase relationship between the clock frequency and the biphase data, which is necessary for reliable data decoding.

There is therefore a need to provide a method with which clock recovery for a biphase-coded data signal is possible even at substantially high data rates.

SUMMARY OF THE INVENTION

This need and others are addressed by the present invention, in which operation is carried out with an uncorrelated clock and, by means of the sampled values and by establishing the bit limits, the original data bits are regenerated from which the bit clock can then be derived in a straightforward way. Particularly accurate clock recovery, which is not susceptible to data jitter and to clock inaccuracies, is obtained when the phase-locked oscillator delivering the sampling frequency is synchronized with the biphase data recovered in this way.

A method according to the invention can be used for both biphase-mark-coded and biphase-space-coded data signals.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The invention will be explained in more detail below with the aid of schematic drawings with reference to an exemplary embodiment for a biphase-mark-coded signal.

DETAILED DESCRIPTION OF THE PREFERRED EMBODIMENT

The biphase-mark-coded data signal B, which is derived from the NRZ data signal A and is to be regenerated, is delivered on the reception side to a sampling circuit 1, downstream of which a detector 2 is arranged. The sampling frequency C for the sampling circuit 1, and the clock frequency for the detector 2, are delivered by a phase-locked oscillator 3 whose output frequency is selected to be 2.5 times as great as the bit frequency of the data signal B.

Using the sampling signal C of the oscillator 3, the biphase data signal B is sampled in the sampling circuit 1, and the sampled values D obtained in this way are delivered to the detector 2. In order to obtain as many sampled values as possible, sampling is carried out in the sampling circuit 1 with both the positive and negative edges of the sampling signal C. With 2.5 times the bit frequency as the sampling frequency, in theory five sampled values per data bit are obtained. Subject to effects such as data jitter and clock accuracy of the biphase data B, however, four or six sampled values D may also be obtained for one data bit. This is established in the detector 2. In this way, the bit limits E can be established in the detector from the successive sampled values D, since, according to the biphase mark code, a transition between zero and one implies either a change between the data bits of the data signal B or a change in the bit middle. Therefore, if the detector 2 establishes a change of the logical state one and zero in the tolerance range of from 4 to 6 sampled values, then this implies a logical zero in the regenerated data signal F, whereas if a change of the sampled values D is established in a substantially short interval, for example after just two logical ones, then this implies a one in the regenerated data signal F.

It is then possible to regenerate the associated bit-clock frequency G in a straightforward way from the thus regenerated data bits F of the original signal A. Both the data bits and the bit clock of the original data signal A are hence regenerated. The detector 2 may be configured with a very high tolerance and, in the exemplary embodiment, it is merely necessary for it to reliably recognize the bits with 4, 5 or 6 sampled values. The detector is therefore tolerant with respect to data jitter and clock accuracy. The data and clock recovery will be even more accurate if the oscillator 3 is synchronized with the bit clock G recovered in this way, as is schematically indicated by the active connection 4 in FIG. 1.

Figure 1:
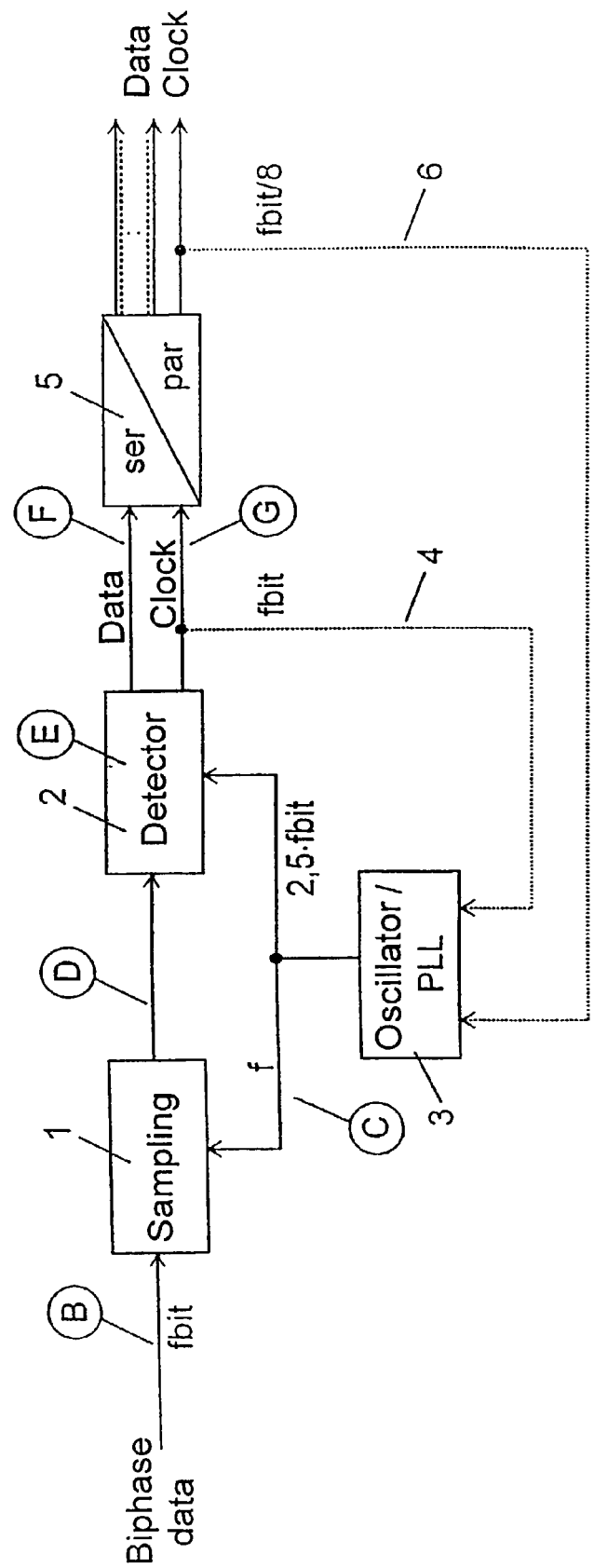
FIG. 1 shows the block diagram of an apparatus according to the invention for carrying out a method according to the invention.
Figure 2:
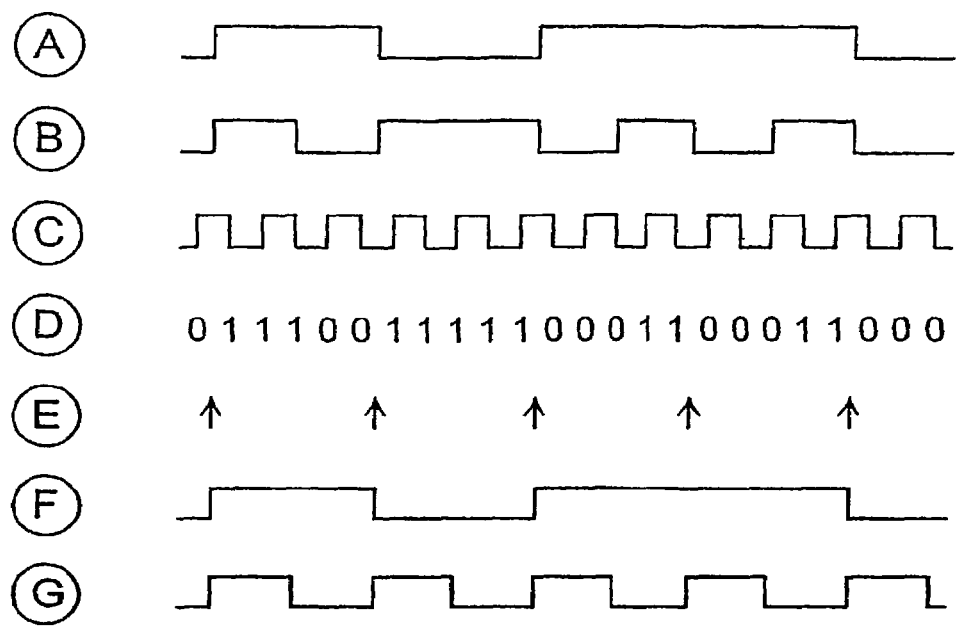
FIG. 2 shows the associated signal waveforms.

The serially regenerated data bits F, with the associated bit clock G, can subsequently be converted into parallel data in the known way by means of a serial/parallel converter 5, and the byte clock obtained thereby can likewise be used for synchronizing the oscillator 3, in the scope of the active connection 6 according to FIG. 1, in order to synchronize the sampling clock accurately with the biphase data.

While the present invention has been described in connection with a number of embodiments and implementations, the present invention is not so limited but covers various obvious modifications and equivalent arrangements, which fall within the purview of the appended claims.

What is claimed is:

1. A method for data and clock recovery in a biphase-coded data signal, comprising:
   sampling the data signal at a sampling frequency that is greater than double a bit frequency of the data signal;
   determining bit limits of the data signal from sampled values of the data signal;

regenerating data bits and an associated bit clock of the data signal based on the determined bit limits;

converting the regenerated data bits from serial to parallel; and synchronizing the clock that generates the sampling frequency using a byte clock of the parallel-converted regenerated data bits.

2. A method according to claim 1, further comprising:

selecting the clock at the sampling frequency to be 2.5 times as great as the bit frequency.

3. A method according to claim 1, further comprising:

synchronizing the sampling frequency using the regenerated bit clock.

4. An apparatus for carrying out the method according to claim 1, comprising:

a sampling circuit, a phase-synchronized oscillator generating the sampling frequency with a sampling frequency of at least 2.5 times the bit frequency, a downstream detector that is clocked with the sampling frequency of the oscillator and in which bit limits of the data signal are determined from the transitions of the sampled values between logical states, and the data bits and the associated bit clock are then regenerated therefrom.

5. An apparatus for data and clock recovery in a biphase-coded data signal, comprising:

a phase-locked oscillator for generating a sampling frequency that is greater than double a bit frequency of the data signal;

a sampling circuit for sampling the data signal at the sampling frequency;

a detector for determining bit limits of the data signal from sampled values of the data signal and regenerating data bits and an associated bit clock of the data signal based on the determined bit limits; and a serial-to-parallel converter for converting the regenerated data bits to parallel;

wherein the phase-locked oscillator is further configured to synchronize the sampling frequency using a byte clock of the parallel-converted data bits.

6. An apparatus according to claim 5, wherein:

the sampling frequency is selected to be 2.5 times as great as the bit frequency.

7. An apparatus according to claim 5, wherein the phase-locked oscillator is further configured to synchronize the sampling frequency using the regenerated bit clock.

* * * * *